May 13, 1941. C. BATCHELLER 2,241,500
METHOD OF MAKING FIBER PANEL BOARD
Filed Sept. 30, 1936
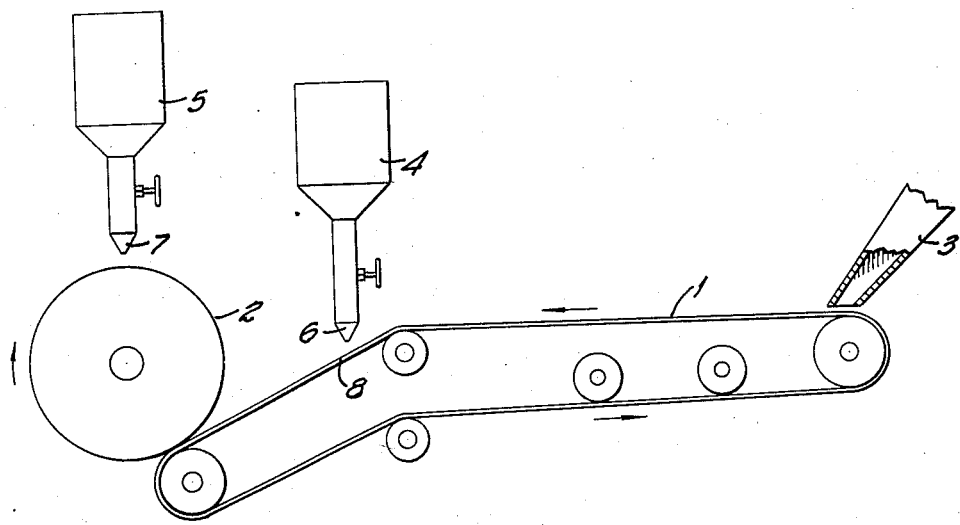
Fig.1
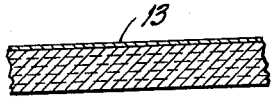
Fig.6
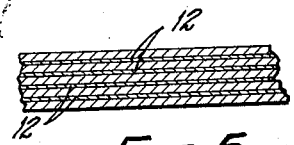
Fig.5
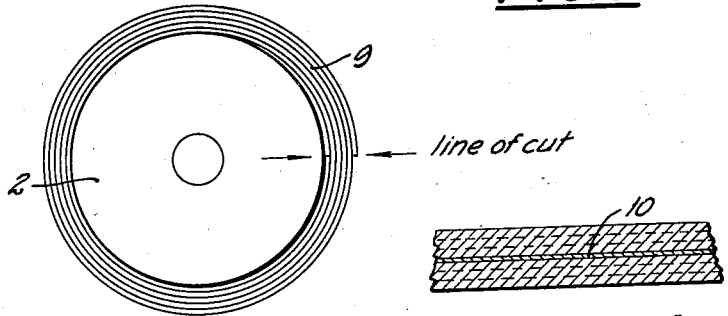
Fig.2 Fig.4
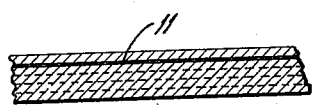
Fig.3
INVENTOR
CLEMENTS BATCHELLER
By
ATTORNEY Patented May 13, 1941

2,241,500

UNITED STATES PATENT OFFICE 2,241,500

METHOD OF MAKING FIBER PANEL BOARD

Clements Batcheller, Glens Falls, N. Y.

Application September 30, 1936, Serial No. 103,283

9 Claims. (Cl. 154—2)

My invention relates generally to improvements in hard pressed fiber-cement panels and sheathing elements and to the method of making the same whereby the general physical properties thereof, such as their impermeability and toughness, are greatly improved, and whereby the tendency of large area sheets to distort and buckle while undergoing the process of hydration and thereafter is eliminated.

More particularly, my invention relates to composite fibrous sheathing or panel elements in which the bonding medium is a self-hardening cement of the Portland or magnesite type and which, at least initially, comprises a plurality of thin layers or laminae to the surface of one or more of which is applied, during their manufacture, relatively thin films of bitumen or the like. My invention further relates to the surface decoration of such products by the application thereto or the incorporation therein of highly stable bituminous compounds.

Cement-asbestos sheet and shingle products as they are now universally manufactured are composed of simple water mixtures of mineral fibers and Portland cement which are formed into the desired thicknesses by means of the well known equipment used in the industry such as the wet-cylinder press, the filter drum, etc. In the accompanying drawing I have illustrated, in a purely diagrammatic way, one type of equipment which may be used to manufacture my products although it is to be understood that the equipment and the general process disclosed in my copending application Serial No. 39,793 may also be used.

In the drawing—

Fig. 1 is a diagrammatic side elevation of a suitable type of apparatus for manufacturing my products;

Fig. 2 is an elevation view showing my improved product at one stage of its manufacture; and Figs. 3, 4, 5 and 6 are fragmentary cross sections of various types of my product.

Referring to the drawing, and particularly to Fig. 1, which represents, in a schematic way, a wet cylinder press or pulp press which is well known in the industry, 1 is a porous felt belt or jacket which travels over the rollers in the direction indicated by the arrows. 2 is a collector drum and 3 is a duct through which a highly fluid water-mixture of fibers and cement is fed on the end of the porous belt 1. It is to be understood that the water-fiber-cement-mixture may be prepared in the ordinary stock beater or by other means (not shown). 4 and 5 are appropriate receptacles provided with spray nozzles 6 and 7, respectively, through which fluid asphalt may be applied to the partially dehydrated cement fiber web carried on the belt or jacket 1. The receptacles 4 and 5 may be provided with heating means when asphalt which is not fluid at ordinary temperatures is used.

In forming cement-fiber products on a press of this type it is to be understood that the highly fluid mixture delivered from the duct 3 is carried along on the belt in the direction of the arrow. Since the belt is porous, much of the water in the mixture drains through the belt so that when the web has reached about the point 8 there remains upon the surface of the belt or jacket a very thin film of cement and interlaced fibers quite similar to a wet web of paper on a Fourdrinier machine. Upon coming in contact with the collector drum 2 the web is picked off the belt by the drum and successive layers or laminae of the web are wound about the drum until the requisite thickness is attained. Usually, it requires the building up of from five to six layers, as shown at 9, to produce in the finished hardened sheet or shingle product a thickness of the order of $\frac{3}{32}$ inch.

Such sheet or shingle products produced by the present method, and particularly in light gauges and large areas, say of the order of 4'x6', become extremely hard and brittle after substantial hydration due to the typical physical characteristics of Portland cement which constitutes about 85% of the product. Because the hydration or hardening continues indefinitely in the presence of surrounding moisture, an additional fault in such products is their constant tendency to buckle and distort from the true plane.

I have discovered that these undesirable characteristics which are inherent to Portland cement-fiber sheet products may be most effectively overcome by a rather simple expedient and slight change in their method of manufacture. In addition, the products are endowed not only with physical qualities which are new and novel but the fabricating properties thereof, particularly because of added toughness and increased flexibility, are very much improved. Moreover, my procedure provides a product having an effective internal barrier to the passage of water, etc., through the sheet.

The foregoing desirable results are attained by interposing between one or more of the laminae a film of a suitable bitumen or bituminous compound. Where the bituminous material is to repose in the vicinity of the center of my finished product, I may use a suitable fluid asphalt of either the natural or the residual type, and which may be either "stable" or "unstable." In order to apply such an asphalt film, the asphalt may be placed in the heated receptacle 4 and sprayed on the moving web through the nozzle 6. By proper regulation, such a film of asphalt may be applied to the top surface of the partially dewatered web upon the belt or jacket and along a length thereof corresponding approximately to the peripheral measurement of the collector drum. In such case, and assuming that six layers or turns of the web are taken around the drum 2, and that the film of asphalt is so applied as to be positioned midway between the six turns, the laminated web when cut from the drum along the line shown in Fig. 2, flattened out, and subjected to heavy pressure, will be formed into a sheet product, such as shown in Fig. 4, having a film of asphalt 10 in the center thereof. Similarly, by properly selecting that portion of the traveling web to which the asphalt is applied, an asphalt film may be positioned between any chosen laminae in the finished product. In Fig. 3 I have shown an asphalt film 11 between the first and second laminae. If desired, by continuously applying the asphalt to those portions of the web which overlie the first turn on the drum 2, a product, such as shown in Fig. 5, having asphalt films 12 between each lamina may be produced.

While it is convenient, for the purpose of describing the manufacture of my product, to refer to it as a laminated structure, it will be apparent that by applying the asphalt to the wet web on the belt 1, as above described, the asphalt will not form a perfectly uniform layer of bitumen in the finished product by reason of the fact that the cement-fiber mat at this point in the product flow has not assumed a uniform layer or film shape. Where a water miscible asphalt is used, such as an asphalt emulsion, the web may be more or less impregnated therewith. However, by applying the asphalt through a nozzle 7 to the web after it has become a smooth surfaced sheet upon the collector drum, a more definitely defined asphalt lamina is produced in the finished product. Then too, by applying the asphalt to the sheet or web when it is upon the drum instead of upon the belt or jacket the possibility of contaminating the belt or jacket with asphalt is eliminated.

While it is possible to produce my internal asphalt laminae from suitable natural or residual asphalts which may be termed "unstable" because they are subject to disintegration when exposed to the atmosphere or direct actinic rays, I find that in order to produce satisfactory aesthetic color surface effects on my product, it is necessary to revert to the use of special proprietary asphalt compounds in the form of water miscible emulsions. In other words, where the asphalt layer is protected by overlying layers or laminae of cement-fiber, natural or residual asphalts may be employed, but when a layer of asphalt is to be applied to the exterior of the product as shown at 13 in Fig. 6 a stable bituminous compound of a proprietary nature and in the form of an emulsion in which the vehicle is water, the dispersed element is asphalt, and the dispersing agent preferably a mineral colloid of the order of Bentonitic clay.

I have discovered that when such a proprietary asphaltic compound in various degrees of dilution with water is applied to the plastic, unset surface of my sheet product by means of the spray nozzle 7, a permanent asphaltic film of attractive color tone results upon the surface of the product after it has been suitably pressed, hydrated and dried. Such products when so surfaced are extremely permanent in color and tone brilliancy even after long exposure to such attacks as would render common asphalts of all types ineffective in a very short time due to rapid and destructive surface oxidation of the asphalt molecules.

While, as stated above, it is possible to use common asphalts with reasonable success to form the internal interposed films or laminae in my product it is to be understood that I prefer in all cases to use throughout a "stable" asphalt emulsion of the type described above.

The application of asphaltic films, as above described, to a cement-asbestos sheet or shingle product produces an entirely new product so far as its improved physical characteristics are concerned when compared to products of the old order. Such films when formed with suitable grades of asphalt render my finished products tough, semi-elastic and highly impervious. Even a single bituminous layer or lamina not only very substantially reduces the frangibility of the product but serves effectively to prevent the finished product from the usual distortion which constantly takes place in products of the old order under a continuing process of hydration. I have also discovered that such internal film or films serve effectively in my product as sound deadeners and the metallic ring customary from the old products under impact is very materially lessened in my products by reason of the presence of such asphaltic film or films.

While I have described my invention in its preferred embodiments, it is to be understood that the words which I have used are words of description and not of limitation. Hence, changes within the purview of the appended claims may be made without departing from the true scope and spirit of my invention in its broader aspects.

What I claim is:

1. The method of making a non-brittle, non-warping cement-fiber sheet product characterized by its impermeability, toughness and resistance to warping and buckling which comprises forming a roll having a length of circumference approximating the length and width of said sheet and comprising a plurality of layers of a plastic web of hydraulic cement and fibrous material, applying a film of liquid asphalt to said web during the roll-forming step, cutting said roll longitudinally thereof and forming a flat sheet therefrom, and thereafter subjecting said sheet to pressure sufficiently high to compress it into a dense hard product.

2. The method of making a non-brittle, non-warping cement-fiber sheet characterized by its impermeability, toughness and resistance to warping and buckling which comprises forming a thin, continuous, web from a fluid mixture containing hydraulic cement, fiber and water, rolling said web while plastic into the form of a hollow cylinder comprising a plurality of layers of said web while applying a thin film of liquid asphalt thereto, cutting said roll longitudinally thereof and forming a flat sheet therefrom, and thereafter subjecting said sheet to pressure sufficiently high to compress it into a dense, hard product.

3. The method of making a non-brittle, non-warping cement-fiber sheet characterized by its impermeability, toughness and resistance to warping and buckling which comprises forming a thin, continuous, web from a fluid mixture containing hydraulic cement, fiber and water, applying a thin film of liquid asphalt thereto, rolling said web into the form of a hollow cylinder comprising a plurality of layers thereof with said film of asphalt therebetween, cutting said cylinder longitudinally and forming a flat sheet therefrom, and thereafter subjecting said sheet to pressure sufficiently high to compress it into a dense, hard product.

4. The method of making a non-brittle, non-warping cement-fiber sheet characterized by its impermeability, toughness and resistance to warping and buckling which comprises forming a thin, continuous, web from a fluid mixture containing hydraulic cement, fiber and water, applying a thin film of liquid asphalt thereto at spaced intervals, rolling said web into the form of a hollow cylinder comprising a plurality of layers thereof with said film of asphalt therebetween, cutting said cylinder longitudinally and forming a flat sheet therefrom, and thereafter subjecting said sheet to pressure sufficiently high to compress it into a dense, hard product.

5. The method of making a non-brittle, non-warping cement-fiber sheet characterized by its impermeability, toughness and resistance to warping and buckling which comprises forming a thin, continuous, web from a fluid mixture containing hydraulic cement, fiber and water, rolling said web while plastic into the form of a hollow cylinder comprising a plurality of layers of said web, applying a film of asphalt emulsion to the exterior surface of said cylinder, cutting said cylinder longitudinally and forming a flat sheet therefrom, and thereafter subjecting said sheet to pressure sufficiently high to compress it into a dense, hard product.

6. The method of making a non-brittle, non-warping cement-fiber sheet product characterized by its impermeability, toughness and resistance to warping and buckling which comprises forming a roll having a length and circumference approximating the length and width of said sheet and comprising a plurality of layers of a plastic web of hydraulic cement and fibrous material, applying a film of asphalt emulsion to said web during the roll-forming step, cutting said roll longitudinally thereof and forming a flat sheet therefrom, and thereafter subjecting said sheet to pressure sufficiently high to compress it into a dense, hard product.

7. The method of making a non-brittle, non-warping cement-fiber sheet characterized by its impermeability, toughness and resistance to warping and buckling which comprises forming a thin, continuous, web from a fluid mixture containing hydraulic cement, fiber and water, rolling said web while plastic into the form of a hollow cylinder comprising a plurality of layers of said web while applying a thin film of asphalt emulsion thereto, cutting said roll longitudinally thereof and forming a flat sheet therefrom, and thereafter subjecting said sheet to pressure sufficiently high to compress it into a dense, hard product.

8. The method of making a non-brittle, non-warping cement-fiber sheet characterized by its impermeability, toughness and resistance to warping and buckling which comprises forming a thin, continuous, web from a fluid mixture containing hydraulic cement, fiber and water, applying a thin film of asphalt emulsion thereto, rolling said web into the form of a hollow cylinder comprising a plurality of layers thereof with said film of asphalt emulsion therebetween, cutting said cylinder longitudinally and forming a flat sheet therefrom, and thereafter subjecting said sheet to pressure sufficiently high to compress it into a dense, hard product.

9. The method of making a non-brittle, non-warping cement-fiber sheet characterized by its impermeability, toughness and resistance to warping and buckling which comprises forming a thin, continuous, web from a fluid mixture containing hydraulic cement, fiber and water, applying a thin film of asphalt emulsion thereto at spaced intervals, rolling said web into the form of a hollow cylinder comprising a plurality of layers thereof with said film of asphalt emulsion therebetween, cutting said cylinder longitudinally and forming a flat sheet therefrom, and thereafter subjecting said sheet to pressure sufficiently high to compress it into a dense, hard product.

CLEMENTS BATCHELLER.

CERTIFICATE OF CORRECTION.

Patent No. 2,241,500.  May 13, 1941.

CLEMENTS BATCHELLER.

It is hereby certified that error appears in the printed specification of the above numbered patent requiring correction as follows: Page 2, second column, line 51, claim 1, for "length of" read --length and--; and that the said Letters Patent should be read with this correction therein that the same may conform to the record of the case in the Patent Office.

Signed and sealed this 15th day of July, A. D. 1941.

(Seal)

Henry Van Arsdale,
Acting Commissioner of Patents.